United States Patent [19]
Whitehead et al.

[11] Patent Number: 4,755,033
[45] Date of Patent: Jul. 5, 1988

[54] EXTERIOR REARVIEW MIRROR FOR A MOTOR VEHICLE

[75] Inventors: Peter J. Whitehead, Emsworth; Ian Boddy, Bognor Regis, both of England

[73] Assignee: Britax Wingard Limited, Chichester, England

[21] Appl. No.: 63,255

[22] Filed: Jun. 17, 1987

[30] Foreign Application Priority Data

Jun. 20, 1986 [GB] United Kingdom ............... 8615065

[51] Int. Cl.$^4$ ........................... B60R 1/06; G02B 7/18
[52] U.S. Cl. .................................... 350/635; 350/604; 350/639; 248/483; 248/549; 248/900; 248/480; 403/123; 403/90
[58] Field of Search ............... 350/635, 604, 606, 632, 350/631, 639; 248/480, 481, 483, 549, 900; 403/123, 90, 144

[56] References Cited

U.S. PATENT DOCUMENTS 3,512,746  5/1970  Vitaloni et al. ..................... 248/483
3,841,769 10/1974  Bowerman ......................... 248/483
4,523,736  6/1985  Manzoni ............................ 248/483
4,620,813 11/1986  Lacher ................................ 403/90
4,651,965  3/1987  Vigna et al. ...................... 350/635

Primary Examiner—Jon W. Henry
Attorney, Agent, or Firm—Hayes, Davis & Soloway

[57] ABSTRACT

An exterior rearview mirror for a motor vehicle has a housing mounted on a base member by means of a ball-and-socket joint comprising a socket formed in the base member and a convex member attached to the housing. The socket comprises the concave inner surface of a hollow part-spherical member. An arm has a concave surface formed on one end and adapted to engage with the convex outer surface of the part-spherical member. Resilient means are arranged to bias the arm towards the convex member so as to urge the concave surface on the arm against the convex outer surface of the part-spherical member and to urge the concave inner surface of the part-spherical member against the convex member, and release means on the other end of the arm are operable to reduce the friction resisting movement of the housing relative to the base member about the part-spherical member. Operation of the release means thus enables the orientation of the housing relative to the base member to be adjusted with relatively little effort.

9 Claims, 6 Drawing Sheets

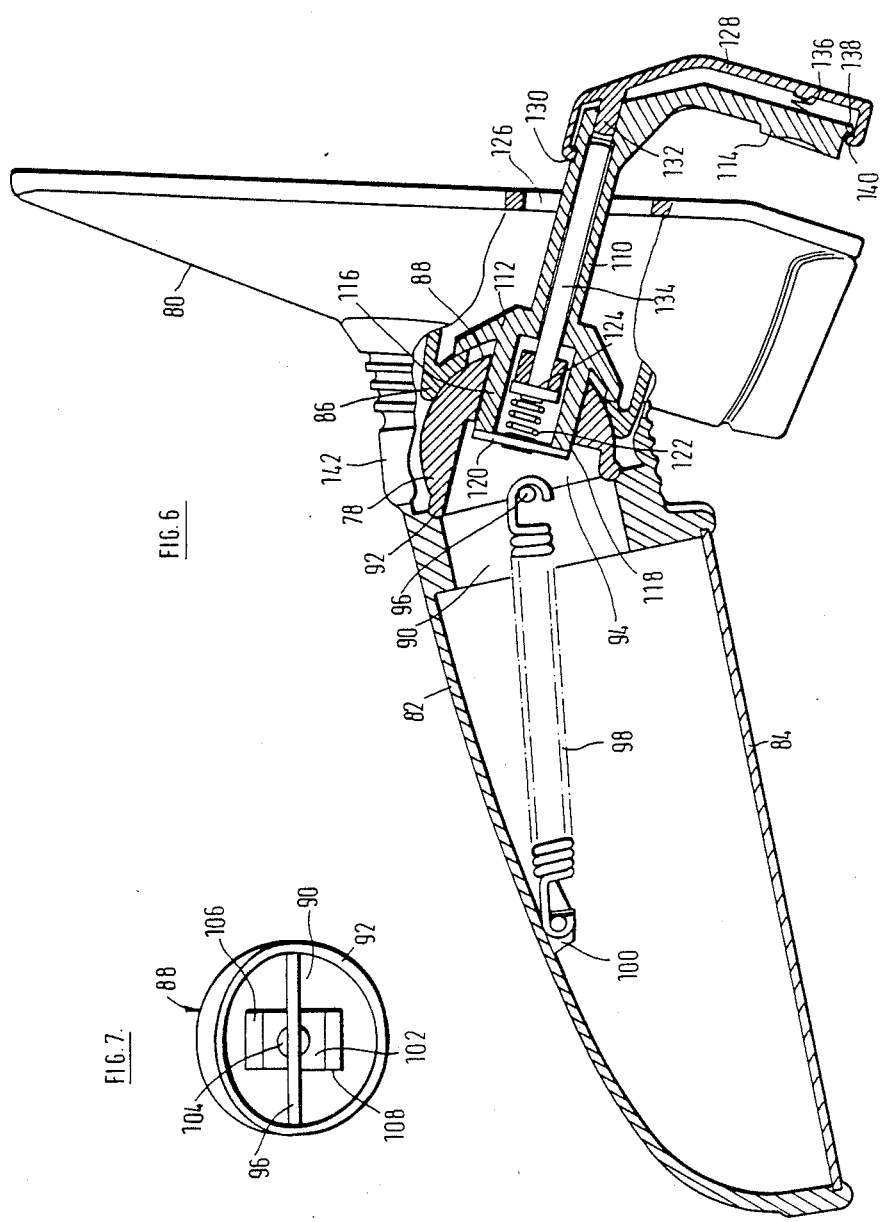

EXTERIOR REARVIEW MIRROR FOR A MOTOR VEHICLE

This invention relates to an exterior rearview mirror for a motor vehicle of the type where the orientation of the mirror housing relative to the vehicle can be adjusted from inside the vehicle.

According to the invention, an exterior rearview mirror for a motor vehicle has a housing mounted on a base member by means of a ball-and-socket joint comprising a socket formed in the base member and a convex member attached to the housing, wherein the socket comprises the concave inner surface of a hollow part-spherical member, an arm has a concave surface formed on one end and adapted to engage with the convex outer surface of the part-spherical member, resilient means are arranged to bias the arm towards the convex member so as to urge the concave surface on the arm against the convex outer surface of the part-spherical member and to urge the concave inner surface of the part-spherical member against the convex member, and release means on the other end of the arm are operable to reduce the efriction resisting movement of the housing relative to the base member about the part-spherical member.

Operation of the release means thus enables the orientation of the housing relative to the base member to be adjusted with relatively little effort.

Preferably, the convex member is fast with a second arm which projects through an opening in the hollow part-spherical member so as to extend substantially parallel to the first arm and the release means comprises means for causing longitudinal displacement of the second arm relative to the first arm.

In one form of the invention, the first arm has a projection which extends through said opening in the hollow part-spherical member and an opening in the convex member, and the resilient means comprises a tension spring extending from an end of said projection to an attachment on the interior of the housing. Preferably, the tension spring is also arranged to hold an abutment formation on the housing in engagement with a complementary formation on the convex member so that the housing is normally retained in a fixed orientation relative to the convex member but is displaceable relative thereto for example if the housing is subject to impact. In this case, the release means may comprise a lateral projection on the first arm and a second arm pivotally mounted on the first arm adjacent to the lateral projection and engaging with the second arm so that squeezing the release lever and the lateral projection together opposes the action of the resilient means.

In another form of the invention, the resilient means comprises a spring engaging with the second arm and the first arm respectively, and extending adjacent thereto. In this case, the release means may comprise a lateral projection on the second arm and a release lever pivotally mounted on the second arm adjacent to the lateral projection and engaging with the first arm so that squeezing the release lever and the lateral projection together opposes the action of the resilient means.

An embodiment of the invention will now be described, by way of example, with reference to the accompanying drawings, in which:

FIG. 6 is a cross-sectional view, similar to FIG. 2, of a further embodiment of the invention; and FIG. 7 is an end view of one of the components of the embodiment shown in FIG. 6.

Figure 1:
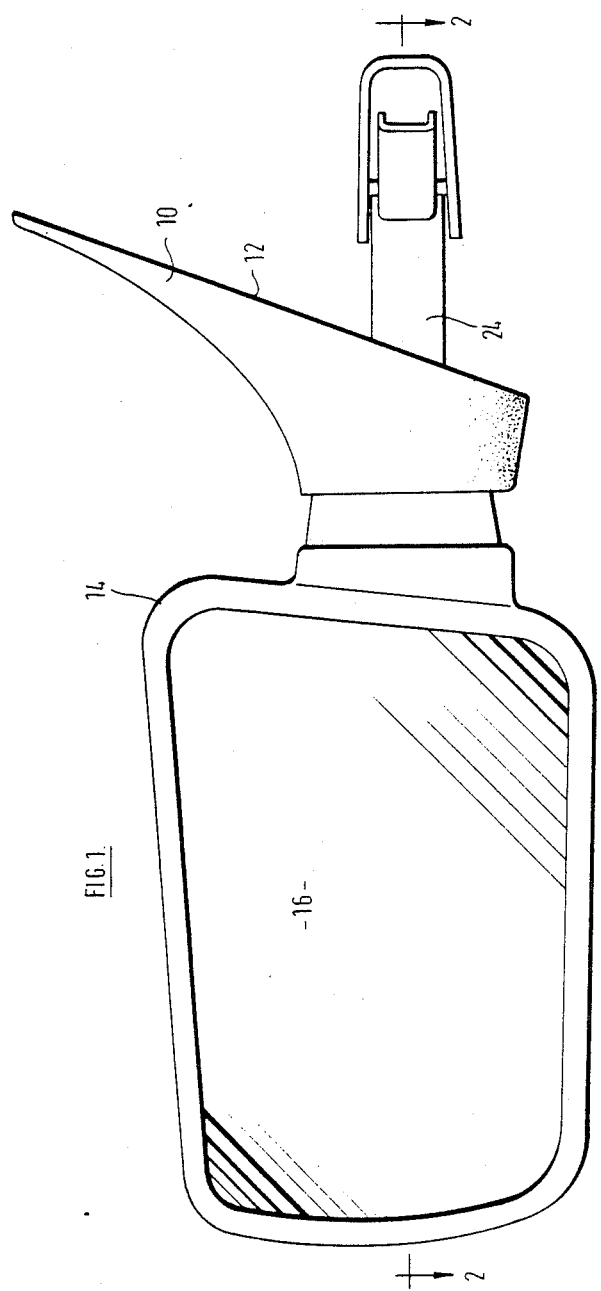
FIG. 1 is an elevational view of an exterior mirror in accordance with one embodiment of the invention, showing only part of the mirror housing and taken from the side from which the mirror is viewed.
Figure 2:
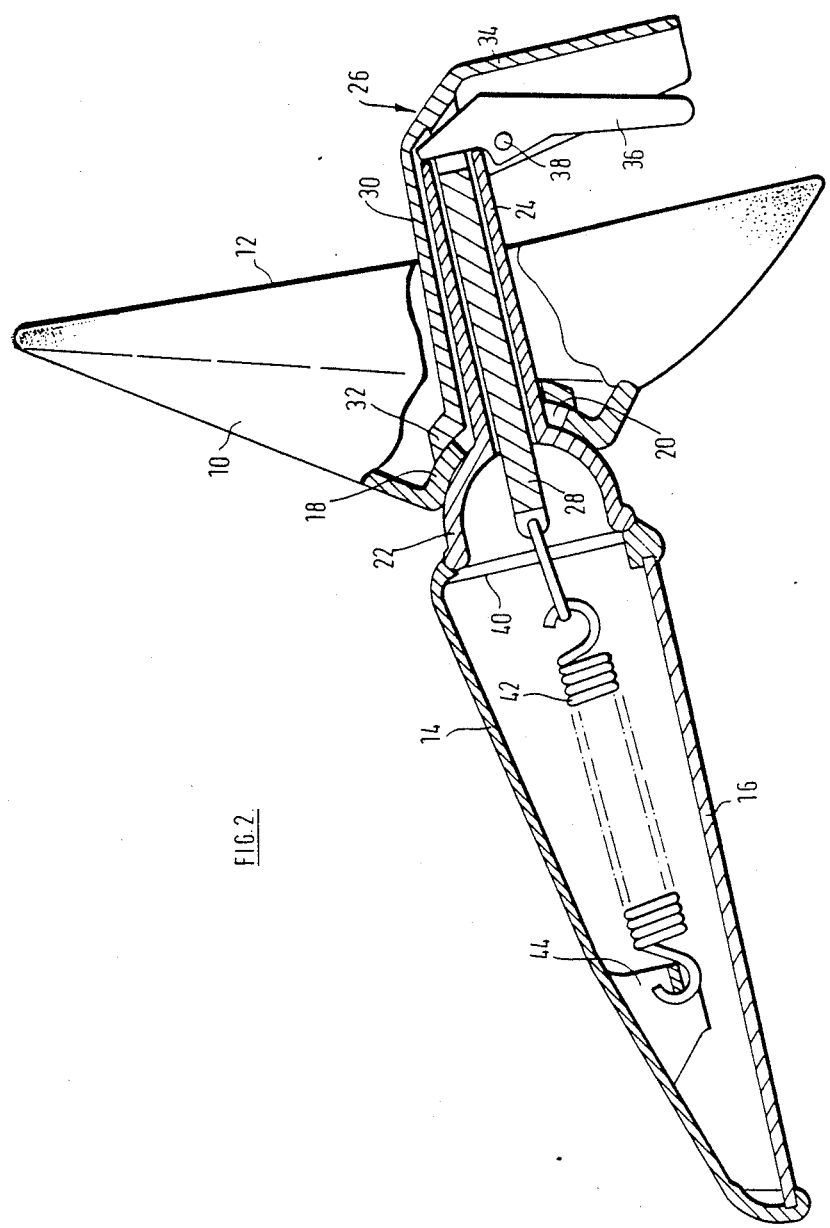
FIG. 2 is a cross-sectional view taken on the line 2—2 in FIG. 1.

Referring to FIGS. 1 and 2, an exterior rearview mirror comprises a base member 10, having a face 12 adapted to abut against a motor vehicle body panel, and a housing 14 in which a mirror glass 16 is mounted. As can best be seen from FIG. 2, the wall of the base member 10 opposite to the face 12 has a part-spherical portion 18 with a concave outer surface and a convex inner surface, with a circular opening 20 extending through the centre thereof. The concave outer surface of the wall portion 18 serves as a socket for a ball-and-socket joint, the ball of which is formed by a hollow spherical formation 22 on one end of a hollow cylindrical stem 24. The stem 24 extends through the hole 20 and projects beyond the face 12 of the base member 10 so as to extend into the interior of a vehicle on which the mirror is mounted.

An arm 26 has a first limb 28 which projects through the cylindrical stem 24 into the interior of the hollow hemispherical formation 22, and a second limb 30 which partially surrounds the stem 24 and carries a partspherical concave formation 32 on its free end which engages with the convex inner surface of the wall portion 18. The arm 26 also has a lateral projection 34 with a release lever 36 mounted thereon by means of a pivot pin 38. One end of the lever 36 engages with the free end of the stem 24 while the other end can be manually squeezed against the projection 34 so as to cause displacement of the stem 24 relative to the arm 26.

The housing 14 has an opening 40, the periphery of which is shaped to engage with the edge of the hemispherical formation 22. A tension spring 42 has one end attached to a formation 44 on the interior of the housing 14, and the other end attached to the free end of the first limb 28 of the lever 26. Thus, the effect of the tension spring 42 is to press the edge of the opening 40 into engagement with the edge of the hemispherical member 22, to press the hemispherical member 22 into engagement with the concave outer surface of the wall portion 18, to press the convex inner surface of the wall portion 18 into engagement with the formation 32 and to press the lever 36 into engagement with the stem 24.

Figure 3:
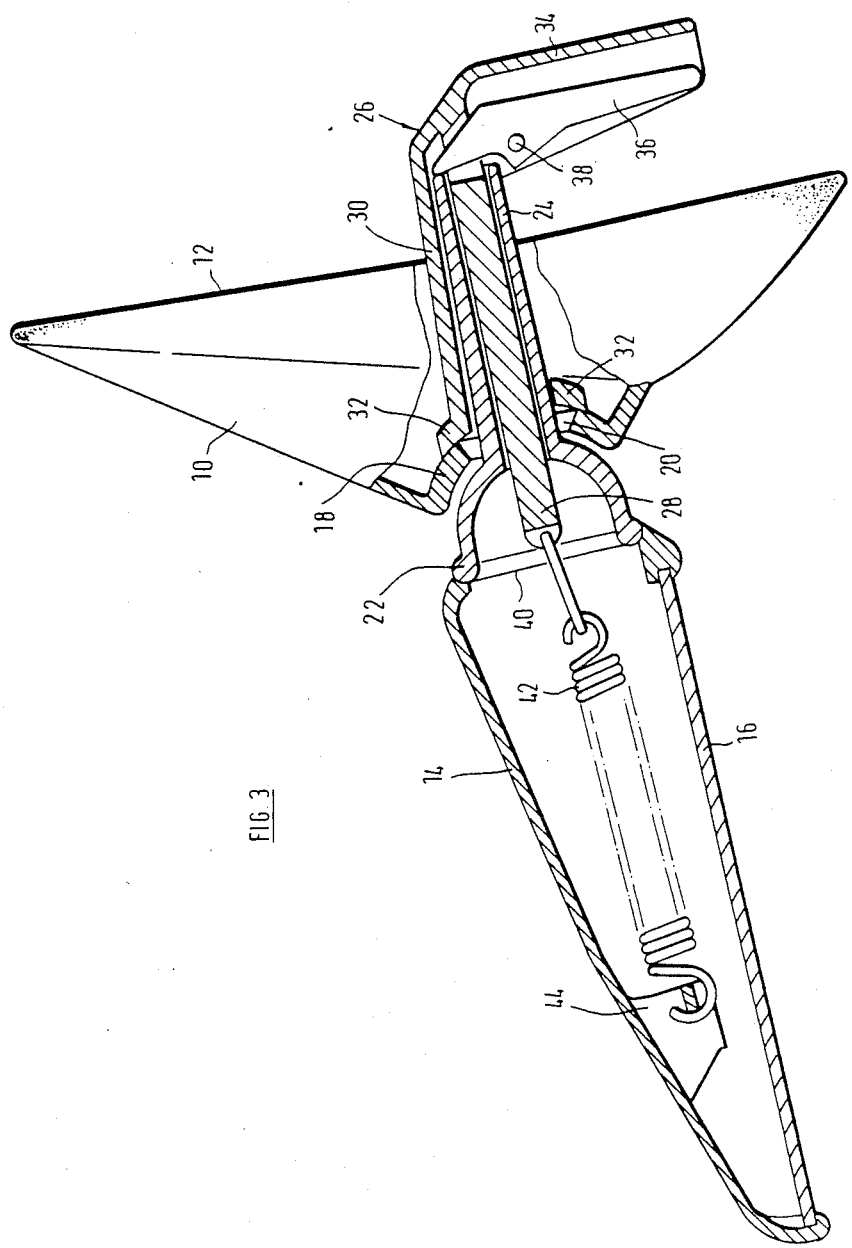
FIG. 3 is a cross-sectional view, similar to FIG. 2, but with the release means actuated.

Turning now to FIG. 3, if the lever 36 is squeezed towards the projection 34 as illustrated, the inner end of the lever 36 displaces the stem 24 towards the mirror housing 16 and thus moves the hemispherical formation 22 out of engagement with the concave outer surface of the wall portion 18. This substantially reduces the friction holding the housing 14 in position and allows its orientation to be adjusted by moving the projection 34. When the housing 14 is in its required position, the lever 36 is released and the spring 42 pulls the hemispherical member 22 back into engagement with the outer concave surface of the wall portion 18, thus holding the housing 14 in its new position.

Figure 4:
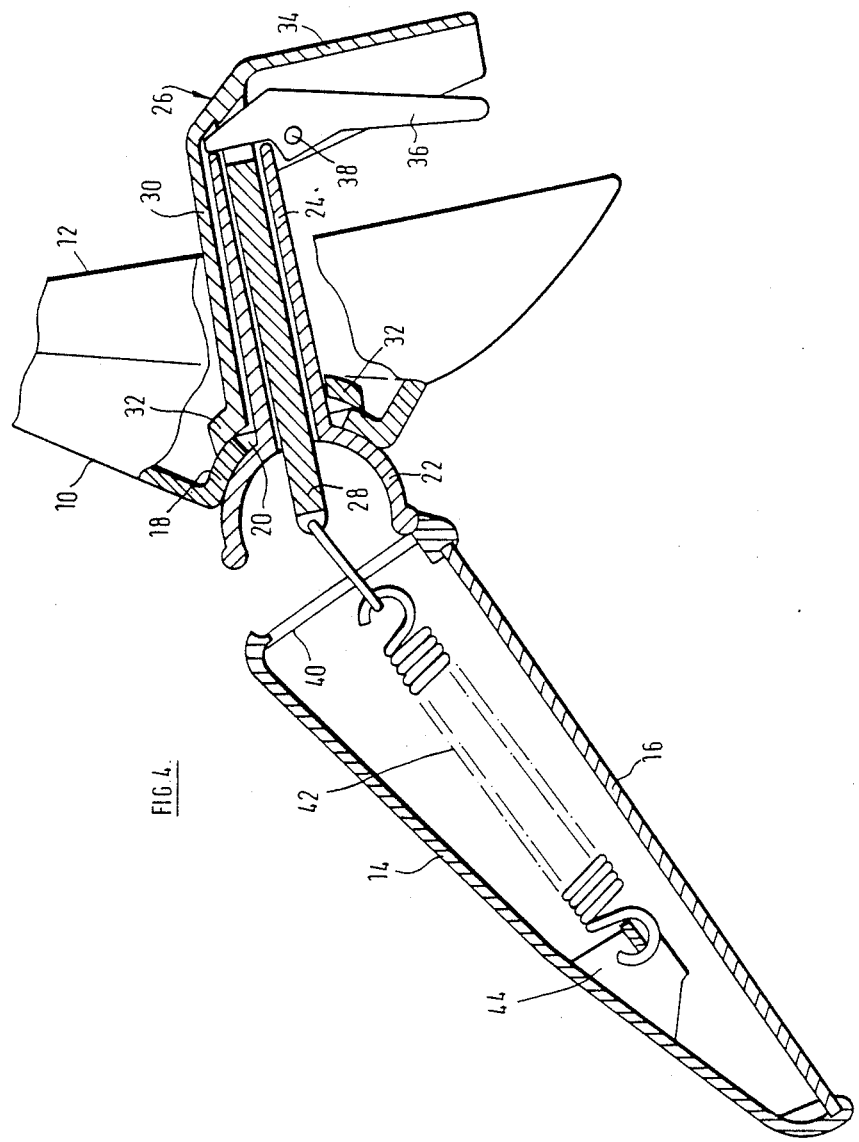
FIG. 4 is a cross-sectional view, similar to FIG. 2, but with the housing displaced rearwardly from its normal position.

Turning now to FIG. 4, if the housing 14 is subject to impact from the front, it can pivot about the location at which the rear edge of the opening 14 engages with the rim of the hemispherical member 22, the rest of the edge of the opening 40 disengaging from the rim of the hemispherical member 22, as illustrated. when the displacing force is released, the spring 42 pulls the housing 14 back into full engagement with the hemispherical member 22. the housing 14 can, of course, pivot in the opposite direction if it is subject to impact from the rear. Thus, the spring 42 serves both to hold the housing 14 in its preset orientation and to permit displacement thereof in the event of impact.

Figure 5:
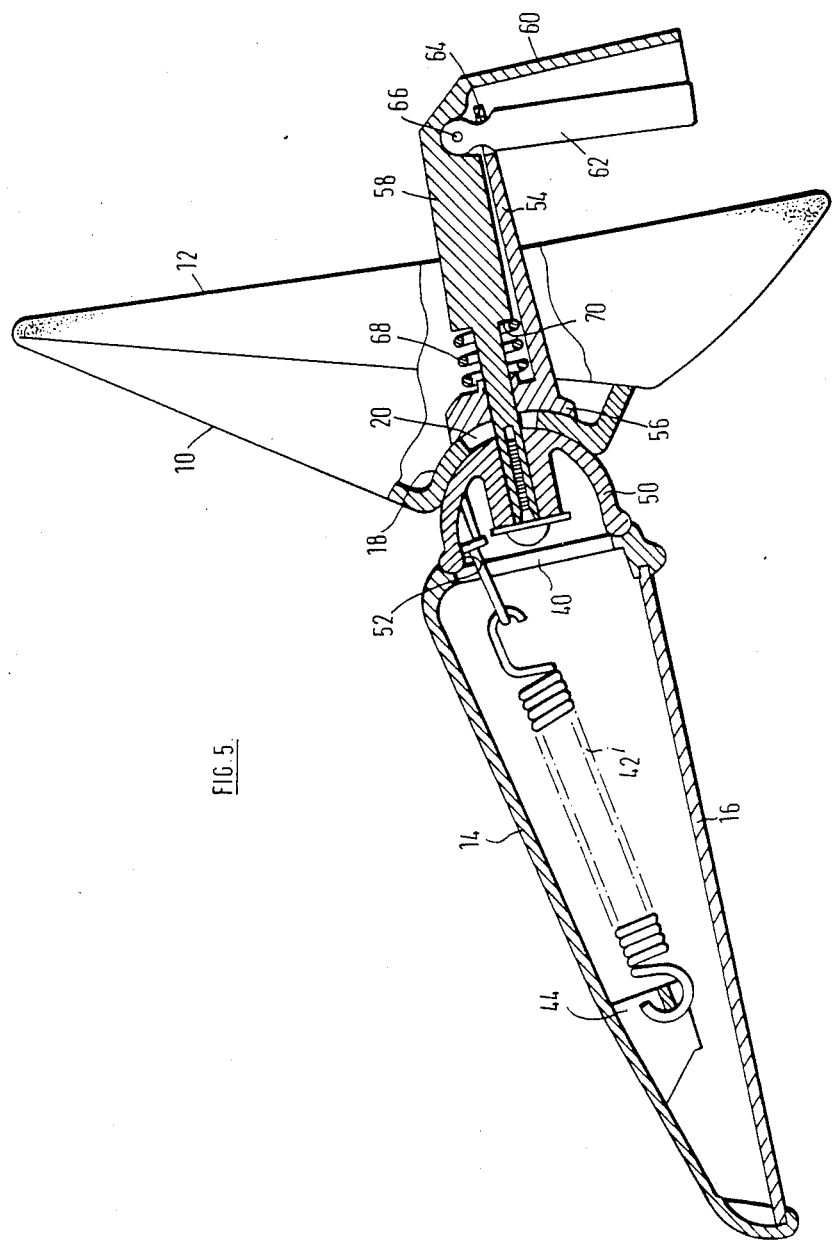
FIG. 5 is a cross sectional view, similar to FIG. 2, of another embodiment of the invention.

FIG. 5 illustrates an alternative embodiment of the invention in which the base member 10 and mirror housing 14 are identical with the corresponding components of the embodiment illustrated in FIGS. 1–4 and are denoted by the same reference numerals. a hollow hemispherical member 50 engages between the concave surface of the wall portion 18 and the edge of the opening 40 in the mirror housing 14 and has an attachment point 52 in its inner surface to which the spring 42 is attached.

A first arm 54 has a flange 56 with a concave end face which engages with the convex inner surface of the wall portion 18. A second arm 58 is secured to the centre of the convex surface of the hemispherical member 52 and projects through the opening 20 in the wall portion 18. The second arm 54 has a lateral projection 60 on its free end.

A lever 62 projects through an opening 64 in the first arm 54 and is pivotally attached by means of a pin 66 to the second arm 58 adjacent to the projection 56 thereof. A compression spring 68 engages between the flange 56 on the first arm 54 and a shoulder 70 on the second arm 58 so as to urge the flange 56 towards the hemispherical formation 50, squeezing the wall portion 18 therebetween. Squeezing the lever 62 against the projection 60 encompasses the spring 68 and reduces the friction between the wall portion 18 and the surfaces of the flange 56 and hemispherical formation 50, thus permitting the orientation of the mirror head 14 to be adjusted.

The effect of impact on the mirror illustrated in FIG. 5, is similar to that of the embodiment illustrated in FIGS. 1 to 4, as described above.

FIGS. 6 and 7 illustrate a further embodiment of the invention, having a base member 80 and housing 82 similar to the base member 10 and housing 14 of the previous embodiments, a mirror glass 84 being mounted in the housing 82. The base member 80 has a part-spherical wall portion 86 with a concave outer surface, a convex inner surface and a circular opening 88 extending through the centre thereof. The concave outer surface of the wall portion 86 serves as a socket for a ball-and-socket joint, the ball of which is formed by a part-spherical coupling member 88.

The housing 14 has an opening 90, the periphery of which is shaped to engage with a circular rim 92 formed on the part-spherical member 88. As can be seen from FIG. 7, the rim 92 bounds a cylindrical recess 94, across which extends a rod 96 to serve as an anchorage for one end of a tension spring 98, the other end of which is connected to an anchorage 100 in the interior of the housing 82. The spring 98 thus serves to bias the housing 82 in engagment with the part-spherical coupling member 88 while allowing it to be displaced in the event of impact, as with the previous embodiments.

The recess 94 has a deepened central portion 102 of rectangular cross-section. A central bore 102 and two rectangular slots 106 and 108 extend through the coupling member 88 from the inner end of the recess 94 therein in alignment with the opening 88 in the part-spherical wall portion 86 of the base member 80. An actuating lever comprises a hollow cylindrical stem 110 with a concave part-spherical flange 112 on one end and a side arm 114 on the other. The concave flange 112 engage with the convex surface of the part-spherical wall portion 86 and has two projections 116 and 118 extending through the rectangular slots 106 and 108 and into the cylindrical part of the recess 90 where a circular disk 120 is secured to their free ends. A compression spring 122, located between the projections 116 and 118 has one end engaging with the disk 120 and the other end urging a second disk 124 into engagement with the bottom of the deepened portion 102 of the recess 90 between the slots 106 and 108. The tension spring 122 thus urges the hemispherical coupling member 88 into engagement with the concave surface of the wall portion 86 and the flange 112 into engagement with the convex portion thereof so as to tend to retain the housing in the orientation in which it is positioned.

The stem 108 of the operating lever projects through a slot 126 in the base member 80 as that the handle 114 is accessible from within the vehicle. A release lever 128 extends parallel to the lever 114 and has a lug 126 at one end which engages in a notch in the side of the stem 108 to act as a fulcrum. The lever 128 has a protuberance 132 which extends into the central hole in the hollow stem 110 so as to engage with a pusher rod 134 accommodated therein. The other end of the pusher rod 134 engages with the disk 124. When the two levers 114 and 128 are squeezed together, relieving the pressure exerted by the disk 124 and thus permitting adjustment of the orientation of the housing.

A compression spring 136 urges the two levers 114 and 128 apart, so as to bring protuberances 138 and 140 on their outer ends into abutment and thereby reduce any tendency from them to rattle.

A flexible boot 142 extends between the base member 80 and the housing 82 so as to cover the joint therebetween.

What is claimed is:

1. An exterior rearview mirror for a motor vehicle having a base member, a hollow part-spherical formation on the base member and having a convex surface and a concave surface, a housing, a convex member attached to the housing and engaging in the concave surface of the part-spherical formation to form a ball-and-socket joint mounting the housing on the base member, an arm having a concave surface formed on one end and adapted to engage with the convex surface of the part-spherical formation, resilient means arranged to bias the arm towards the convex member so as to urge the concave surface on the arm against the convex surface of the part-spherical formation and to urge the concave surface of the part-spherical formation against the convex member, and release means on the other end of the arm operable to reduce the friction resisting movement of the housing relative to the base member about the part-spherical formation.

2. An exterior rearview mirror according to claim 1, further comprising a second arm fast with the convex member and projecting through an opening in the hollow part-spherical formation so as to extend substantially parallel to the first arm, the release means comprising means for causing longitudinal displacement of the second arm relative to the first arm.

3. An exterior rearview mirror according to claim 2, wherein the first arm has a projection which extends through said opening in the hollow part-spherical formation and an opening in the convex member, and the resilient means comprises a tension spring extending from an end of said projection to an attachment on the interior of the housing.

4. An exterior rearview mirror according to claim 3, wherein the tension spring is also arranged to hold an abutment formation on the housing in engagement with a complementary formation on the convex member so that the housing is normally retained in a fixed orientation relative to the concave member but is displaceable relative thereto.

5. An exterior rearview mirror according to claim 2, wherein the release means comprises a lateral projection on the first arm and a release lever pivotally mounted on the first arm adjacent to the lateral projection and engaging with the second arm so that squeezing the release lever and the lateral projection together opposes the action of the resilient means.

6. An exterior rearview mirror according to claim 2, wherein the resilient means comprises a spring engaging with the second arm and the first arm respectively, and extending adjacent thereto.

7. An exterior rearview mirror according to claim 6, wherein the release means comprises a lateral projection on the second arm and a release lever pivotally mounted on the first arm adjacent to the lateral projection and engaging with the first arm so that squeezing the release lever and the lateral projection together opposes the action of the resilient means.

8. An exterior rearview mirror according to claim 1, wherein a projection on the concave surface on the arm extends through an opening in the convex member, the resilient means comprises a compression spring engaging btween an end of the projection remote from the concave surface and a thrust member to urge the thrust member into engagement with a surface of the convex member opposite to the convex thereof, and the release means comprises a push rod extending parallel to the arm and engaging with the thrust member.

9. An exterior rearview mirror according to claim 8, wherein the release means further comprises a lateral projection on the arm and a release lever pivotally mounted on the arm adjacent to the lateral projection and engaging with the push rod so that squeezing the release lever and the lateral projection together opposes the action of the compression spring.

* * * * *